Figure 1:
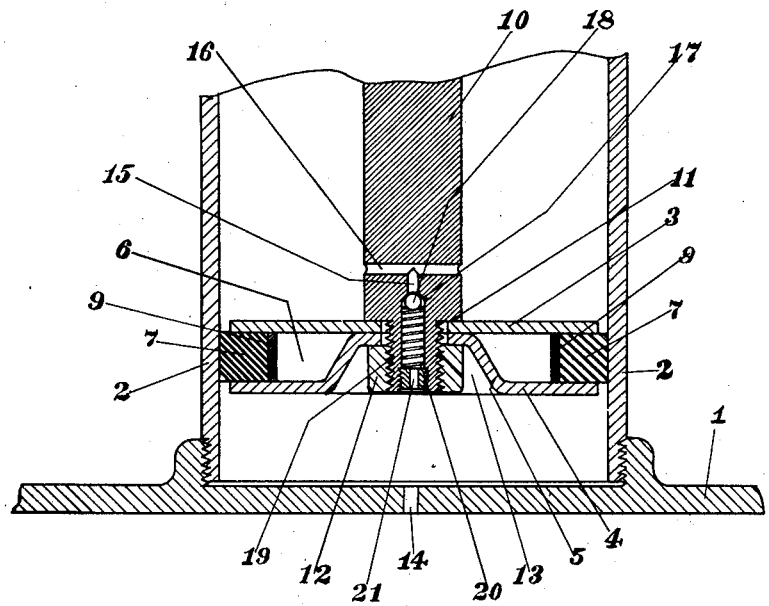

A. G. NORTON.
PUMP.
APPLICATION FILED APR. 24, 1919.

1,369,461.

Patented Feb. 22, 1921.

INVENTOR.
Arthur G. Norton
BY
his ATTORNEYS.

UNITED STATES PATENT OFFICE.

ARTHUR G. NORTON, OF ROCHESTER, NEW YORK.

PUMP.

1,369,461.                Specification of Letters Patent.     Patented Feb. 22, 1921.

Application filed April 24, 1919. Serial No. 292,292.

*To all whom it may concern:*

Be it known that I, ARTHUR G. NORTON, a citizen of the United States, and resident of Rochester, in the county of Monroe and State of New York, have invented certain new and useful Improvements in Pumps, of which the following is a specification.

The present invention relates to pumps, an object of this invention being to provide a piston construction in which the packing is in the form of a continuous ring of yielding material and is acted upon by spring means which tends to expand the ring against the internal wall of the pump cylinder. Another object of the invention is to improve the construction of the piston so as to reduce the cost of manufacture thereof, while at the same time permitting the piston to move to the extreme end of the compression cylinder so that practically all of the air within the cylinder will be discharged through the outlet of the pump. Another object of the invention is to provide for mounting the piston by-pass valve in the piston rod so that a strong and durable mounting for the valve may be obtained without interference with the piston packing.

To these and other ends, the invention consists of certain parts and combinations of parts, all of which will be hereinafter described, the novel features being pointed out in the appended claims.

Figure 2:
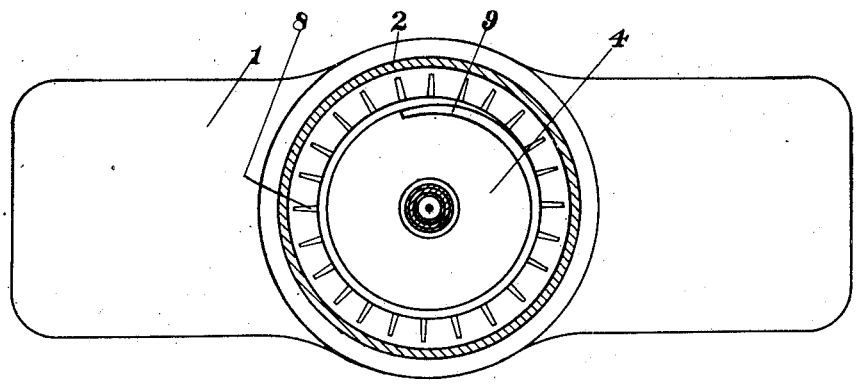

In the drawings:

Figure 1 is a vertical section through a portion of an air pump embodying the present invention; and Fig. 2 is a section on the line 2—2, Fig. 1.

Referring more particularly to the drawing, 1 indicates the base of the pump to which the pump cylinder 2 is secured, the construction of these parts being immaterial to the present invention. Operating in the cylinder is a piston which preferably embodies two disks 3 and 4. The disk 3 is flat, while the disk 4 is provided with a central pressed up portion 5 brought into abutment with the disk 3 to space the disks from each other. In this spaced portion 6 thus provided is arranged a packing ring 7, which is preferably continuous, that is, it is unbroken or unsplit, being made of yielding material such as leather or other yielding material of which packing rings are made. Preferably the inner face of this ring is provided with a number of radial slits 8 in order to increase the expansibility of the ring without providing any slits in its face which coöperate with the internal wall of the cylinder. Spring means is arranged in the ring, this means in this instance, consisting of a split spring ring 9 with overlapping ends situated between the piston disks 3 and 4 and acting to expand the packing ring 7.

The piston is secured to a piston rod 10 which in this instance is reduced at one end to provide a shoulder 11 against which the disk 3 of the piston abuts. The disk 3 and the disk 4 are preferably held to this piston rod by a nut 12 which engages external threads on the reduced portion of the piston rod and lies within the pocket 13 formed by the pressed up portion 5 of the disk 4, the reduced portion of the piston rod extending centrally through the disks 3 and 4. The pocket 13 is so formed that it receives the nut 12 in such a manner that the nut does not interfere with the movement of the piston to the extreme lower end of the cylinder and as a consequence all of the air below the piston may be discharged through the port 14 in the base 1, thus preventing any great amount of the compressed air remaining in the cylinder.

The by-pass between the opposite faces of the piston is in this instance formed by a port which has a portion 15 extending longitudinally and centrally through the piston rod in order to connect with a lateral port 16 in the piston rod, the portion 15 extending through the reduced portion on which the nut 12 is arranged. The portion 15 of the port is provided with a seat 17 against which the ball valve 18 is held by a helical spring 19 which is mounted in the portion 15 and is held therein by a screw plug 20 which is in turn formed with an opening 21. With this arrangement when the piston is moved upwardly, the ball valve will move away from the seat 17 and permit the air to pass below the piston, the valve 18 closing when the piston is moved downwardly and causing the air on the lower side of the piston to be forced through the discharge 14.

A pump construction in accordance with this invention provides a piston which is inexpensive to manufacture and has a packing providing a continuous engagement with the inner wall of the cylinder. This packing is formed of yielding material and is expanded through spring means arranged within the packing. The packing and the spring means are situated in the chamber formed in the piston and the piston rod extends centrally through the piston and is provided with a by-pass permitting the air to pass from the upper side of the piston to the under or compression side of such piston. The chamber 6 within the spring ring may be used for storing a lubricant such as vaseline or hard grease for keeping the ring lubricated.

What I claim as my invention and desire to secure by Letters Patent is:

1. In combination with a piston formed of two rigid disks spaced apart at their edges, a continuous ring of yielding packing material mounted loosely between the disks, and a split ring with overlapping ends loosely arranged between the disks within the packing ring and having a natural tendency to expand to press the packing ring outwardly, said ring having a width co-extensive with the distance between the disks.

2. In combination with a piston rod, two disks detachably secured to the rod, one of said disks being flat and the other being pressed up centrally to abut the first named disk and to space the disks at their edges, a continuous ring of yielding packing material arranged between the disks about the pressed up portion, and a split ring with overlapping ends surrounding the pressed up portion, co-extensive in width with the distance between the disk and having a natural tendency to expand to press the packing ring outwardly.

3. In combination with a piston, a continuous ring of yielding packing material provided with radial slits on its inner periphery, and spring means arranged within the packing ring and exerting continuous pressure to expand such packing ring.

ARTHUR G. NORTON.